(12) United States Patent
Kim et al.

(10) Patent No.: US 8,838,611 B2
(45) Date of Patent: Sep. 16, 2014

(54) DOCUMENT RANKING SYSTEM AND METHOD BASED ON CONTRIBUTION SCORING

(75) Inventors: Dong Jin Kim, Seongnam-si (KR); Sang-Wook Kim, Seongnam-si (KR)

(73) Assignee: NHN Corporation, Seongnam-si (KR)

( * ) Notice: Subject to any disclaimer, the term of this patent is extended or adjusted under 35 U.S.C. 154(b) by 34 days.

(21) Appl. No.: 13/202,009

(22) PCT Filed: Dec. 15, 2009

(86) PCT No.: PCT/KR2009/007481
§ 371 (c)(1), (2), (4) Date: Aug. 17, 2011

(87) PCT Pub. No.: WO2010/095807
PCT Pub. Date: Aug. 26, 2010

(65) Prior Publication Data
US 2011/0302176 A1    Dec. 8, 2011

(30) Foreign Application Priority Data

Feb. 17, 2009    (KR) .................. 10-2009-0012898

(51) Int. Cl.
*G06F 17/30*      (2006.01)
(52) U.S. Cl.
CPC ................ *G06F 17/30616* (2013.01)
USPC ........................ 707/748; 707/750
(58) Field of Classification Search
CPC G06F 17/30663; G06F 17/3053; G06F 17/21
USPC ............ 707/748, 750, 999.003, 999.006
See application file for complete search history.

(56) References Cited

U.S. PATENT DOCUMENTS

| 6,212,517 | B1 | 4/2001 | Sato et al. |
| 7,024,408 | B2 * | 4/2006 | Dehlinger et al. ............ 707/739 |
| 7,499,919 | B2 | 3/2009 | Meyerzon et al. |

FOREIGN PATENT DOCUMENTS

| JP | 11-025108 | 1/1999 |
| JP | 2004-164290 | 6/2004 |
| JP | 2007-094552 | 4/2007 |
| KR | 10-2008-0046670 | 5/2008 |
| KR | 10-2008-0101224 | 11/2008 |

OTHER PUBLICATIONS

International Search Report of PCT/KR2009/007481 issued on Aug. 2, 2010, 4 pages.
Dong-Un An, et al "Document Ranking of Web Document Retrieval Systems" published in Journal of Information Management No. 2 vol. 34, 2002, pp. 55-66.

(Continued)

*Primary Examiner* — Monica Pyo
(74) *Attorney, Agent, or Firm* — Greer Burns & Crain Ltd.

(57) ABSTRACT

Disclosed are a document ranking system and method based on contribution scoring. The document ranking system includes: a content score calculating unit for calculating content scores for documents with respect to at least one word contained in the documents, with regard to each such word; a contribution score calculating unit for calculating contribution scores for the documents with respect to jointly occurring words; and a ranking unit for ranking the documents with respect to the at least one word, with regard to each such word, by using the content scores and the contribution scores.

31 Claims, 6 Drawing Sheets

(56) References Cited

OTHER PUBLICATIONS

Watanabe, T., Textbook of SEO Letting a Search Make a Hit Hard, Japan, Shoei Co., Ltd., Jun. 16, 2008, First Edition, p. 56-61, 107-109, 114-117.

Otsuka, K., Extraction of the Web Community in Consideration of Hierarchy Characteristics Based on the HITS Algorithm, Institute of Electronics, Information and Communication Engineers Article Magazine, Japan, Corporate Judicial Person Institute of Electronics, Information and Communication Engineers, Dec. 1, 2007, J90-D No. 12, p. 3161-3169.

* cited by examiner

DOCUMENT RANKING SYSTEM AND METHOD BASED ON CONTRIBUTION SCORING

CROSS REFERENCE RELATED APPLICATIONS

This application is the National Stage of International Application No. PCT/KR2009/007481, filed Dec. 15, 2009, and claims priority from and the benefit of Korean Patent Application No. 10-2009-0012898, filed on Feb. 17, 2009, both of which are hereby incorporated by reference for all purposes as if fully set forth herein.

BACKGROUND OF THE INVENTION

1. Field of the Invention

The present invention relates to an invention for determining the rank of a document, and more particularly to a method and system for ranking a document based on the score of the document itself and the document ranking score that is based on relations between documents linked to the document.

2. Discussion of the Background

In general, search engines use five to eight billion pieces of index information as the number of documents continues to increase around the world. Users expect desired information to be displayed on the first page of a search result on which five to ten documents may be generally displayed. Thus, the information that users desire access may be displayed only when the accuracy of a search engine improves as the number of documents increases.

Conventionally, typical information search has been based on the information included in the document. However, the search for documents may additionally be based on the significance of the documents by use of the link information between documents, and thereby the accuracy of the search result can be enhanced.

However, the significance of documents may not always be associated with words, and thus optimized schemes for enhancing accuracy are warranted. In addition, a website that is important only in a field different from a searched subject may be ranked high in the final ranking, which is an event referred to as a topic drift and tends to decrease the accuracy of a search.

In general, documents are connected to other documents through links, and the documents connected to each other through links may be related. Thus, there is a need for a scheme to enhance the accuracy of search by using the link information of a document in association with a word.

SUMMARY OF THE INVENTION

Exemplary embodiments of the present invention provide a document ranking system and method that may enhance the accuracy of a document ranking by use of a document ranking score including the combination of a content score based on the content of the document and the contribution score based on the link information of the document.

Exemplary embodiments of the present invention provide a document ranking system and method that may effectively consider the level of contribution by determining a contribution coefficient that indicates the level of contribution between documents connected to each other through links, according to the link configuration and the content score.

Exemplary embodiments of the present invention provide a document ranking system and method that may prevent abuse through an outlink by employing an accumulation coefficient that corresponds to a ratio of a score for direct contribution by a first document, to the contribution score of the first document for contribution to the second document.

Exemplary embodiments of the present invention provide a document ranking system and method that may prevent the document ranking score of a document from decreasing through a document outlink that applies an accumulation coefficient to the contribution score, and may ease the difficulty of a web search due to restraints on the use of an outlink.

An exemplary embodiment of the present invention discloses a document ranking system including a content score calculating unit to calculate a content score of a document for each of at least one word contained in the document, a contribution score calculating unit to calculate a contribution score of the document for a common word, and a ranking unit to rank the document for the at least one word, using the content score and the contribution score.

The document ranking system may include a contribution coefficient determining unit to determine a contribution coefficient of a first document for contributing to a second document, with respect to a common word.

The document ranking system may further include an accumulation coefficient calculating unit to calculate an accumulation coefficient of the first document, corresponding to a ratio of a score for direct contribution by the first document to a contribution score of the first document, with respect to the common word.

An exemplary embodiment of the present invention discloses a document ranking method, including calculating, by a content score calculating unit, a content score of a document for each of at least one word contained in the document, calculating, by a contribution score calculating unit, a contribution score of the document for a common word, and ranking, by a ranking unit, the document for the at least one word, using the content score and the contribution score.

The calculating may include determining, by the contribution coefficient determining unit, a contribution coefficient of a first document for contributing to a second document with respect to the common word.

The document ranking method may further include calculating, by an accumulation coefficient calculating unit, an accumulation coefficient of the first document, corresponding to a ratio of a score for direct contribution by the first document to a contribution score of the first document, with respect to the common word.

According to embodiments of the present invention, a document ranking system and method may enhance the accuracy of a document ranking by use of a document ranking score including the combination of a content score based on content of a document and a contribution score based on the link information of the document.

According to embodiments of the present invention, a document ranking system and method may prevent abuse through an outlink by employing an accumulation coefficient that corresponds to the ratio of the score for direct contribution by the first document to the contribution score of the first document for contributing to a second document.

According to embodiments of the present invention, a document ranking system and method may prevent the document ranking score of a document from decreasing through a document outlink that applies an accumulation coefficient to a contribution score, and may ease the difficulty of a web search due to restraints on the use of an outlink.

According to embodiments of the present invention, a document ranking system and method may effectively consider the level of contribution by determining a contribution coefficient that indicates the level of contribution between documents connected to each other through links, according to the link configuration and the content score.

DETAILED DESCRIPTION OF THE ILLUSTRATED EMBODIMENTS

The embodiments are described below in order to explain the present invention by referring to the figures. This invention may, however, be embodied in many different forms and should not be construed as limited to the embodiments set forth herein. Reference will now be made in detail to exemplary embodiments of the present invention, examples of which are illustrated in the accompanying drawings, wherein like reference numerals refer to the like elements throughout. A document ranking method according to an embodiment of the present invention may be performed by each configuration of a document ranking system.

Figure 1:
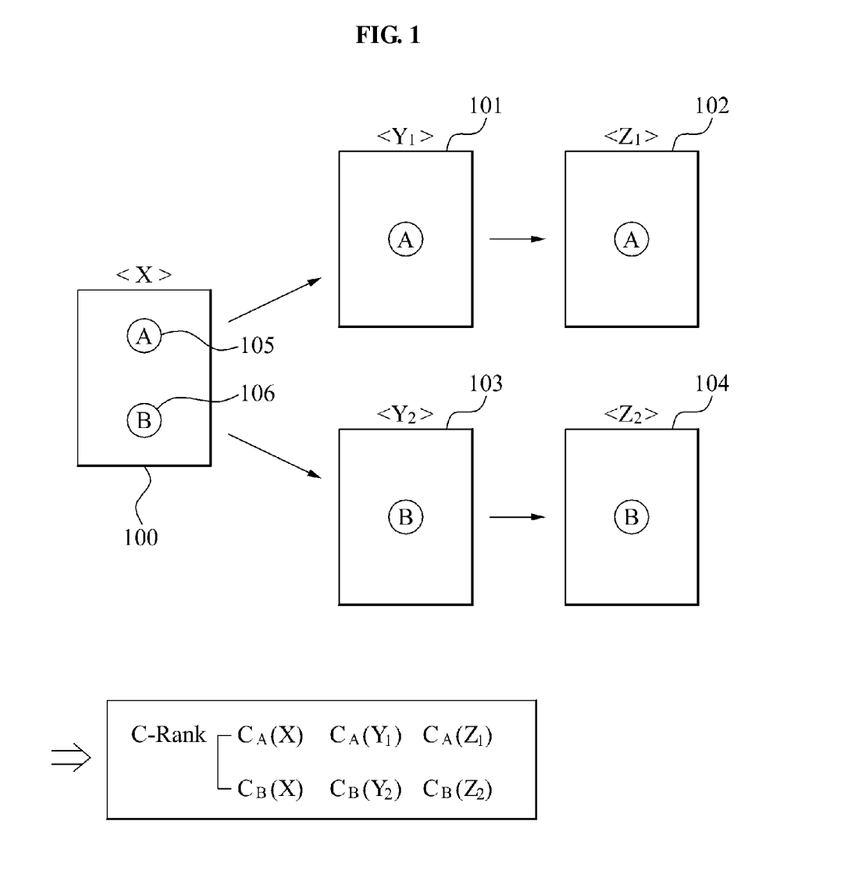
FIG. 1 is a diagram illustrating a process of ranking a document according to an exemplary embodiment of the present invention.

FIG. 1 is a diagram illustrating a process of ranking a document according to an embodiment of the present invention.

FIG. 1 illustrates a document $<Y_1>$ 101, a document $<Z_1>$ 102, a document $<Y_2>$ 103, and a document $<Z_2>$ 104 linked to a document $<X>$ 100. In this instance, the document $<X>$ 100, the document $<Y_1>$ 101, and the document $<Z_1>$ 102 each include a word (A) 105, and the document $<X>$ 100, the document $<Y_2>$ 103, and the document $<Z_2>$ 104 each include a word (B) 106.

In this instance, the word (A) 105 corresponds to a common word that is included in the document $<X>$ 100, the document $<Y_1>$ 101, and the document $<Z_1>$ 102, and the word (B) 106 corresponds to a common word that is included in the document $<X>$ 100, the document $<Y_2>$ 103, and the document $<Z_2>$ 104. That is, a common word corresponds to the word commonly included in the documents connected to each other through links, and each document may include at least one common word.

The process of ranking a document according to an embodiment of the present invention may optimize calculating time while maintaining the accuracy of search by use of the following web environment.

1) A web developer may create a link to a document to supplement the document that lacks some information by virtue of the information included in the linked document. 2) Utilization of information may diminish as the distance from the document including the information increases even though the document is linked. 3) The number of common words included in two documents connected to each other is correlated with the degree of relevance of the two documents, and the number of common words may decrease as the documents are less relevant. 4) Users of a search engine may be responsive to the first rank of a search result, and may be relatively less responsive to lower ranks.

In this instance, the word (A) 105 and the word (B) 106 may constitute a search query inputted by a user. Here, the document ranking system according to an embodiment of the present invention may rank documents with respect to each word. In this instance, the document ranking system may rank the documents by combining the contents and link information of the documents. More specifically, the document ranking system may rank the documents, by combining the content scores of the documents with respect to each word included in the documents with the contribution scores indicating the effectiveness of other documents that also contain the word.

For example, a few basic concepts may be defined in advance to rank a document, as shown in the following.

(1) Criterion for Important Document

In a document, the main information to be provided to a user may in text. The details or additional information related to the text may be provided via a connection to another document through a link. Here, the documents connected by the link, for example, the document $<Y_1>$ 101 and the document $<Y_2>$ 103 of FIG. 1, may describe in the same subject as the document including the links, such as the document $<X>$ 100 of FIG. 1, or the documents connected by the links may be the documents containing a supplement to the details or specifications about the word (A) 105 and the word (B) 106 of FIG. 1. In some cases, the documents connected by the links may be documents which have no relevance to the document including the links, such as advertisements unrelated to the contents of the document.

The content of a document may be an essential factor for evaluation of the quality of the document. The user would expect to be provided with a high-quality document which contains desired content as a search result. The document ranking system may provide a connection to an essential document contributing to the text quality of the document.

According to the embodiment of the present invention, the document ranking system may determine as significant documents meeting the requirements as follows. 1) A document having a high content score for a given word, 2) A document linked to a document having a high content score for a given word, and iii) a document linked to a document that frequently uses information from the former.

(2) Contribution Score of Linked Document

A contribution score of a linked document (the document $<Y_1>$ 101 and the document $<Y_2>$ 103 in FIG. 1) for contributing to a document including the link (the document $<X>$ 100) may be determined based on the content scores of the document $<Y_1>$ 101 and the document $<Y_2>$ 103 for the given search query.

When two documents have relatively high associations with a given search query, the linked document may greatly contribute to the quality of the document including the link. However, when the document including the link has high relevance to the search query whereas the linked document has low relevance to the search query, the linked document may not contribute to the quality of the document including the link.

For example, it is assumed that a document on a book is linked to a document on a car. When the two documents contain a large number of words associated with a car, the document on the book may include content about a book associated with a car and thus may be determined to be contributing to the quality of the document on the car.

However, when the document on the book does not contain words associated with a car, the document on the book may be an advertisement document or a document linked for another purpose. In this case, the document on the book may not be determined to be contributing to the quality of the document on the car.

(3) User Interests According to Ranking

As to a search result, the relative rankings of retrieved documents are important, and users may want desired information to be exposed on the first page of the search result. When the document ranking system outputs the first to the tenth ranking of documents, users may be more responsive to the high ranking documents, for example, the document ranked first, while less responsive to low ranking documents, for example, the documents ranked between 200th and 300th.

Thus, the document ranking system according to an embodiment of the present invention may more accurately determine the relative rankings of predetermined high-ranked documents than the relative rankings of low-ranked documents. That is, by determining the relative rankings of only the high-ranked documents more accurately, the users may be satisfied with the search result. Therefore, the determination of the relative rankings does not have to be performed in relation to numerous documents. Consequently, resources required for producing the search results may be saved.

Referring to FIG. 1 based on such concepts, the document ranking system may calculate content scores and contribution scores of the document <X> 100, the document <$Y_1$> 101, and the document <$Z_1$> 102 for the word (A) 105, and determine document scores (C-Ranks) to rank the documents with respect to the word (A) 105 by combining the content scores and the contribution scores.

Likewise, the document ranking system may calculate content scores and contribution scores of the document <X>> 100, the document <$Y_2$> 103, and the document <$Z_2$> 104 for the word (B) 106, and determine document scores (C-Ranks) to rank the documents for the word (B) 106 by combining the content scores and the contribution scores. The final rankings may be determined by arranging document ranking scores determined for the pairs of a document and a word, for example, in the form of $C_A(X)$ of FIG. 1, and the like.

A community may be generated by utilizing an embodiment of the present invention. The community may refer to a collection of documents generated by people having common interests or sharing common themes. Thus, the documents constituting the community may contain words associated with a predetermined theme, and may be expected to be linked to each other while having qualities greater than a predetermined level.

It may be assumed that the community is a connected sub-graph that includes documents of which the sum of document ranking scores (C-Ranks) for words associated with a subject is greater than a predetermined level. Here, this assumption reflects a characteristic of a general community. Thus, various communities may be effectively extracted by utilizing document ranking scores.

A scheme of retrieving a community is as follows. First, the document ranking score (C-Rank) of a document is calculated. Second, the sum of document ranking scores of each document for words associated with a theme is determined. Third, a connected sub-graph is constructed in which the sum of document ranking scores is greater than a predetermined level, by searching neighboring documents starting from the document having the greatest document ranking. When no more documents to add exist, another sub-graph may be constructed starting from the document having the greatest document ranking score among the documents that are not participating in the community. Such process is repeated as needed. A sub-graph in which the number of connected documents is greater than a predetermined number among the constructed sub-graphs may be defined as a community. Further, the community in which the sum of document ranking scores for each word of all the documents is the greatest may be defined as the most active community.

Figure 2:
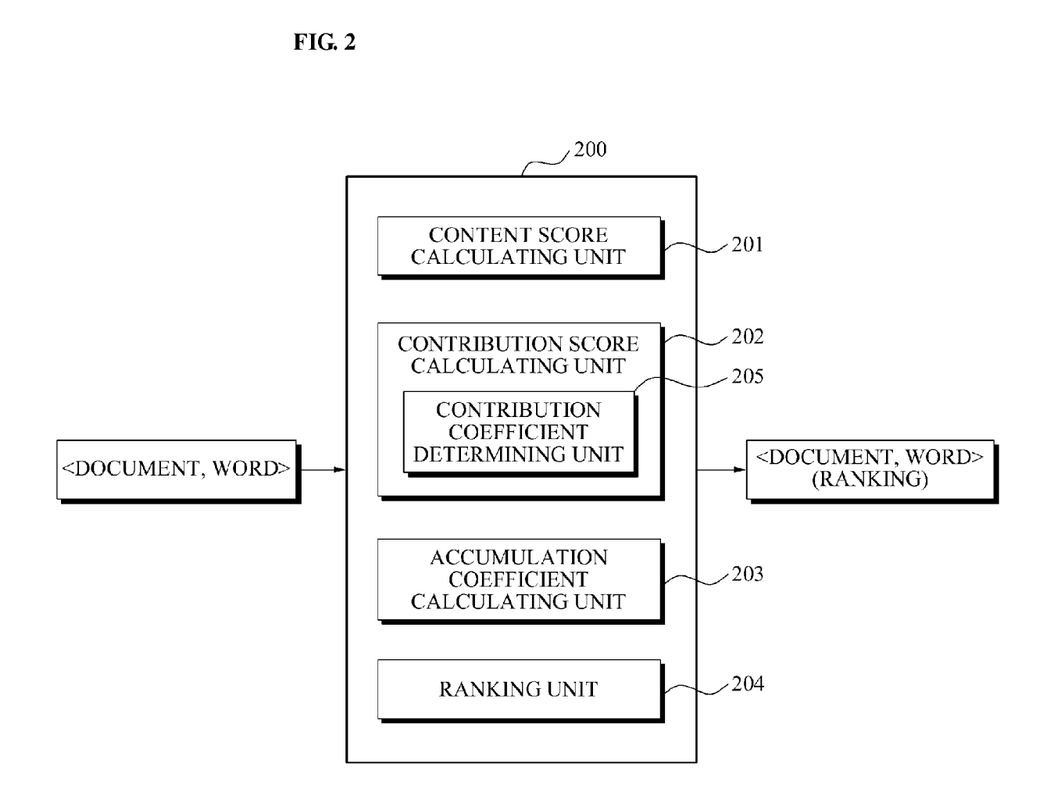
FIG. 2 is a block diagram illustrating an overall configuration of a document ranking system according to an exemplary embodiment of the present invention.

FIG. 2 is a block diagram illustrating an overall configuration of a document ranking system according to an embodiment of the present invention.

Referring to FIG. 2, the document ranking system 200 may include a content score calculating unit 201, a contribution score calculating unit 202, an accumulation coefficient calculating unit 203, and a ranking unit 204. Also, the contribution score calculating unit 202 may include a contribution coefficient determining unit 205.

The document ranking system 200 may extract a common word from linked documents. According to an embodiment of the present invention, the document ranking system 200 may obtain a content score and a contribution score of a document, and then combine the content score and the contribution score to rank the document for a predetermined word.

The content score calculating unit 201 may calculate a content score of a document for each of at least one word contained in the document. As an example, the content score calculating unit 201 may calculate the content score based on relevance between content of the document and the at least one word. The content score of a document may correspond to an original value indicated by the document. When documents are plural, content scores may be calculated for each of at least one word included in the respective documents.

As another example, the content score calculating unit 201 may calculate a content score of a document by evaluating a quality of the document through content of the document such as the similarity of the document with a word, the size of a letter, the length of the document, whether an image exists, and the like.

The contribution score calculating unit 202 may calculate a contribution score of the document for a common word. In this instance, the contribution coefficient determining unit 205 may determine a contribution coefficient of a first document for contributing to a second document for the common word. Here, the contribution coefficient denotes a coefficient for the first document's contribution to the value of the second document, and the common word denotes at least one word included commonly in the first document and the second document.

Here, the first document denotes a linked document, and the second document denotes a document including a link. In this instance, when a link is connected from the second document to the first document, the first document denotes a document corresponding to an outlink of the second document, and the second document denotes a document corresponding to an inlink of the first document.

For example, when a link path is present to include a plurality of steps of links from the second document to the first document, the contribution coefficient determining unit 205 may determine the contribution coefficient of the first document for contributing to the second document by using the contribution coefficient of a document corresponding to the link path.

When the first document is connected to the second link through a single link, the contribution coefficient determining unit 205 may determine the contribution coefficient of the first document for contributing to the second document using the content score of the first document, the content score of the second document, and the content score of the third document corresponding to an outlink of the second document.

In this instance, the contribution coefficient determining unit 205 may determine the contribution coefficient of the first document for contributing to the second document that is proportional to the content score of the first document and is inversely proportional to the content score of the second document and the content score of the third document.

Finally, the contribution score calculating unit 202 may calculate a contribution score of the first document by applying the content score of the second document to the contribution coefficient of the first document for contributing to the second document for the common word included commonly in the first document and the second document. The further details of determining the contribution coefficient and calculating the contribution score will be described with reference to FIG. 3.

The process of ranking a document based on a basic model according to an embodiment of the present invention may rank the document using a contribution score and a content score. The process of ranking a document based on an invariant sum model and a hybrid model according to another embodiment of the present invention may correspond to the process of ranking a document by applying an accumulation coefficient to a contribution score and a content score.

The accumulation coefficient calculating unit 203 may calculate the accumulation coefficient of the first document, corresponding to the ratio of the score for direct contribution by the first document to the contribution score of the first document with respect to a common word.

For example, the accumulation coefficient calculating unit 203 may calculate the accumulation coefficient of the first document, by using the content score of the first document and the content score of the fourth document corresponding to an outlink of the first document. In this instance, the sum obtained by applying the accumulation coefficient of the first document and the contribution coefficient of the fourth document may be equal to a predetermined value. For example, the predetermined value may correspond to "1." The further details of calculating of the accumulation coefficient will be described with reference to FIG. 4.

The ranking unit 204 may rank the document based on the at least one word included in the document, using the content score and the contribution score. In this instance, the ranking unit 204 may determine a document ranking score (C-Rank) by combining the content score and the contribution score, and rank the document by arranging documents according to document ranking scores.

According to an embodiment of the present invention, when the basic model is used to rank a document, the ranking unit 204 may determine a document ranking score (C-Rank) for each word included in the document by summing up a content score and a contribution score. In this instance, the basic model refers to the model in which the ranking of a document increases as the number of inlinks increases, whereas the document may be independent of the increase or decrease of the number of outlinks.

According to an embodiment of the present invention, when the invariant sum model is used to rank a document, the ranking unit 204 may determine a document ranking score (C-Rank) for each word by summing a content score to which an accumulation score is applied and a contribution score to which an accumulation score is applied.

A document ranking system performing the basic model may have an issue with a document ranking that may be increased on purpose by maliciously adding an outlink to generate a cycle. Such abuse may decrease the accuracy for document ranking, and lead to the generation of malicious documents. To prevent such abuse, the ranking unit 204 may rank a document through the invariant sum model that reflects, on document ranking, only a score for directly contributing to another document, out of contribution scores for contributing to the another document, which is referred to as an accumulation coefficient.

According to the invariant sum model, a document ranking score may decrease as outlinks are generated. In this instance, according to the invariant sum model, abuse by the addition of outlinks may be prevented, whereas web surfing may become difficult for a user due to restrictions on using outlinks. Thus, to prevent the rank of a document from decreasing due to an outlink, the ranking unit 204 may rank a document based on the hybrid model.

When the hybrid model is used to rank a document according to an embodiment of the present invention, the ranking unit 204 may determine a document ranking score (C-Rank) for a word by adding a content score to which the accumulation coefficient is not applied and a contribution score to which the accumulation coefficient is applied. In this instance, the document ranking score may be determined in the form of the pair of a document and a word.

Figure 3:
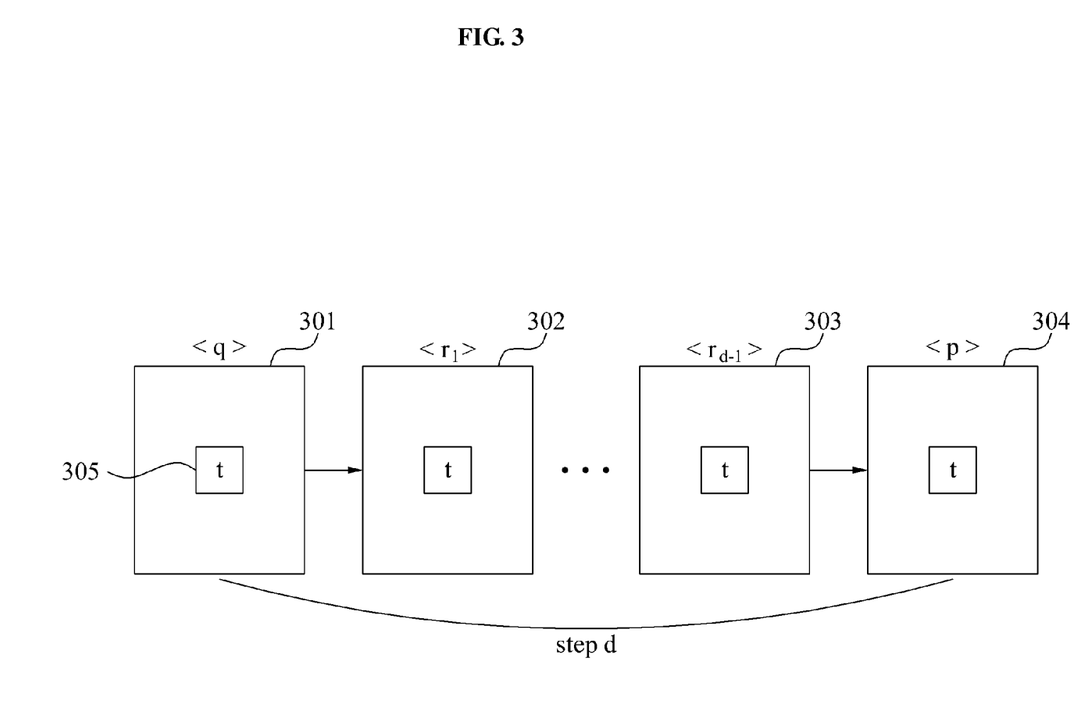
FIG. 3 is a diagram illustrating a process of determining a contribution coefficient of a document for a common word according to an exemplary embodiment of the present invention.

FIG. 3 is a diagram illustrating a process of determining a contribution coefficient of a document for a common word according to an embodiment of the present invention.

The contribution coefficient determining unit 205 may determine the contribution coefficient of the first document for contributing to the second document for the common word. In this instance, the contribution coefficient may denote a coefficient for the first document's contribution to the value of the second document.

In a set of documents shown in FIG. 3, a document <q> 301 reaches a document <p> 304 through d-number of steps (here d is a plural number) of a link path. The set of documents corresponding to the link path is denoted as D(p,d). Here, the document <p> 304 may correspond to the first document, and each of the documents reaching the document <p> 304 may correspond to the second document.

For example, the ranking unit 204 may rank a document based on either one of Equation 1 and Equation 2 as shown below. Here, Equation 1 and Equation 2 are based on the basic model.

$$C_t(p) = s_t(p) + \alpha \sum_d \sum_{q \in D(p,d)} \alpha_t^d(q, p) s_t(q) \qquad \text{[Equation 1]}$$

$$C_t(p) = \alpha s_t(p) + (1-\alpha) \sum_d \sum_{q \in D(p,d)} \alpha_t^d(q, p) s_t(q) \qquad \text{[Equation 2]}$$

Here, "t" denotes a word 305. In Equation 1, α denotes a value greater than or equal to "0," that is, α≥0. In Equation 2, α denotes a value greater than or equal to "0" and less than "1," that is, 0≤α≤1. $C_t(p)$ may denote a document ranking score (C-Rank) for ranking the document <p> 304, that is, the first document for a word (t) 305.

$s_t(p)$ denotes a content score of the document <p> 304 for the word (t) 305 based on content of the document <p> 304, and $$\sum_{d}\sum_{q\in D(p,d)}\alpha_t^d(q,p)s_t(q)$$

denotes a contribution score of the document <p> 304, that is, the first document, for contributing to the document <q> 301, that is, the second document.

In this instance, $\alpha_t^d(q,p)$ denotes a contribution coefficient for contribution to the document <q> 301 the document <p> 304 meets when reversing the link path by as many as d-number of steps, that is, the contribution coefficient of the document <p> 304 which is the first document contributing to the document <q> 301 which is the second document.

As illustrated in Equation 1 and Equation 2, the contribution score calculating unit 202 may calculate a contribution score of the first document by applying the content score of the second document to the contribution coefficient of the document <p> 304 which is the first document contributing to the document <q> 301, which is the second document.

Referring to FIG. 3, when there is a link path including a plurality of steps of links from the second document, that is, the document <q> 301, to the first document, that is, the document <p> 304, the contribution coefficient determining unit 205 may determine the contribution coefficient of the first document with respect to the second document using the contribution coefficients of the documents corresponding to the link path (a document <$r_1$> 302 through a document <$r_{d-1}$> 303 which are). For example, the contribution coefficient determining unit 205 may determine the contribution coefficient based on the following Equation 3.

$$\alpha_t^d(q,p) = \alpha_t^1(q,r_1) \times \prod_{i=1}^{d-2}\alpha_t^1(r_i, r_{i+1}) \times \alpha_t^1(r_{d-1}, p) \quad \text{[Equation 3]}$$

In this instance, Equation 3 is based on the link path $(q \to r_1 \to r_2 \to \ldots \to r_{d-1} \to p)$ for the document <q> 301 to reach the document <p> 304 through d-number of steps of the link path, as shown in FIG. 3. Referring to Equation 3, the contribution coefficient $\alpha_t^d(q,p)$ of the first document with respect to the second document may be determined based on the contribution coefficients of the documents corresponding to the link path, that is, the document <$r_1$> 302 to the document <$r_{d-1}$> 303. Here, the contribution coefficients of the documents corresponding to the link path may be determined using the contribution coefficients of respective neighboring documents on the link path, for example, a contribution coefficient of $r_2$ for contributing to $r_1$ in a link $r_1 \to r_2$.

According to an embodiment of the present invention, when the first document is connected to the second link through a single link, the contribution coefficient determining unit 205 may determine the contribution coefficient of the first document with respect to the second document by using the content score of the first document, the content score of the second document, and the content score of the third document corresponding to an outlink of the second document. As an example, when the first document is connected to the second document through a single link, the contribution coefficient determining unit 205 may determine the contribution coefficient of the first document with respect to the second document as presented in Equation 4. In this instance, Equation 4 is merely an example, and a specific scheme for determining a contribution coefficient according to the configuration of a system may be modified based on the following Equation 4.

$$\alpha_t^1(q,p) \begin{cases} = \dfrac{s_t(p)}{s_t(q) + \sum_{r \in outlink(q)} s_t(r)} & \text{when there exists link } q \to p \\ = 0 & \text{when there exists no link } q \to p \end{cases} \quad \text{[Equation 4]}$$

Referring to Equation 4, the contribution coefficient determining unit 205 may determine the contribution coefficient $\alpha_t^1(q,p)$ of the first document with respect to the second document that is proportional to the content score of the first document, that is, the document <p> 304, and is inversely proportional to the content score of the second document, that is, the document <q> 301, and the content score of the third document. In this instance, as the number of third documents corresponding to the outlinks of the second document, that is, the document <q> 301, increases, the contribution coefficient of the first document with respect to the second document may decrease.

Referring to Equation 4, as the first document (the document <p> 304) has higher relation with the word (t) 305 than the second document (the document (q) 301), in other words, as $s_t(p)$ is greater than $s_t(q)$, the contribution coefficient $\alpha_t^1(q,p)$ of the first document with respect to the second document may increase. Conversely, as the second document (the document <q> 301) has a higher relation with the word (t) 305 than the first document (the document <p> 304), in other words, as $s_t(q)$ is greater than $s_t(p)$, the contribution coefficient $\alpha_t^1(q,p)$ of the first document with respect to the second document may decrease.

Additionally, as the number of the third documents connected to the second document (the document <q> 301) by outlinks increases to supplement the information on the word (t) 305 contained in the second document (the document (q) 301), in other words, as the number of the documents r increases in $$\sum_{r \in outlink(q)} s_t(r),$$

the contribution coefficient $\alpha_t^1(q,p)$ of the first document for contributing to the second document may decrease. Here, the third document may refer to all documents connected to the second through links to supplement the word (t) 305, and may be separate from the documents ($r_1$) 302 through the document ($r_{d-1}$) 303 of FIG. 3.

For example, when it is assumed that the documents p, the document q, and the document r are connected by links such as $r \to q \to p$, the descriptions of FIG. 3 may be applied to these links as follows.

Referring to Equation 1 and Equation 2, the contribution score of the document q for contributing to the document r is $\alpha_t^1(r,q)s_t(r)$. Referring to Equation 1 and Equation 2, the contribution scores of the document p with respect to the document q and the document r are $\alpha_t^1(q,p)s_t(q)$ and $\alpha_t^2(r,p)s_t(r)$, respectively. Referring to Equation 3, the contribution score $\alpha_t^2(r,p)s_t(r)$ of the document p with respect to the document r is $\alpha_t^1(r,q)\alpha_t^1(q,p)s_t(r)$.

Thus, the contribution score of the document p with respect to the document q and the document r is $(\alpha_t^1(r,p)s_t(r)+s_t(q)) \times \alpha_t^1(q,p)$. Accordingly, the contribution score $(\alpha_t^1(r,p)s_t(r)+s_t(q)) \times \alpha_t^1(q,p)$ of the document p for contributing to the document q and super-documents of the document q such as the document r, may be obtained from the contribution score $\alpha_t^1(r,q)$ of the document q with respect to the super-documents of the document q such as the document r, and from the content score $s_t(r)$ of the document q.

Figure 4:
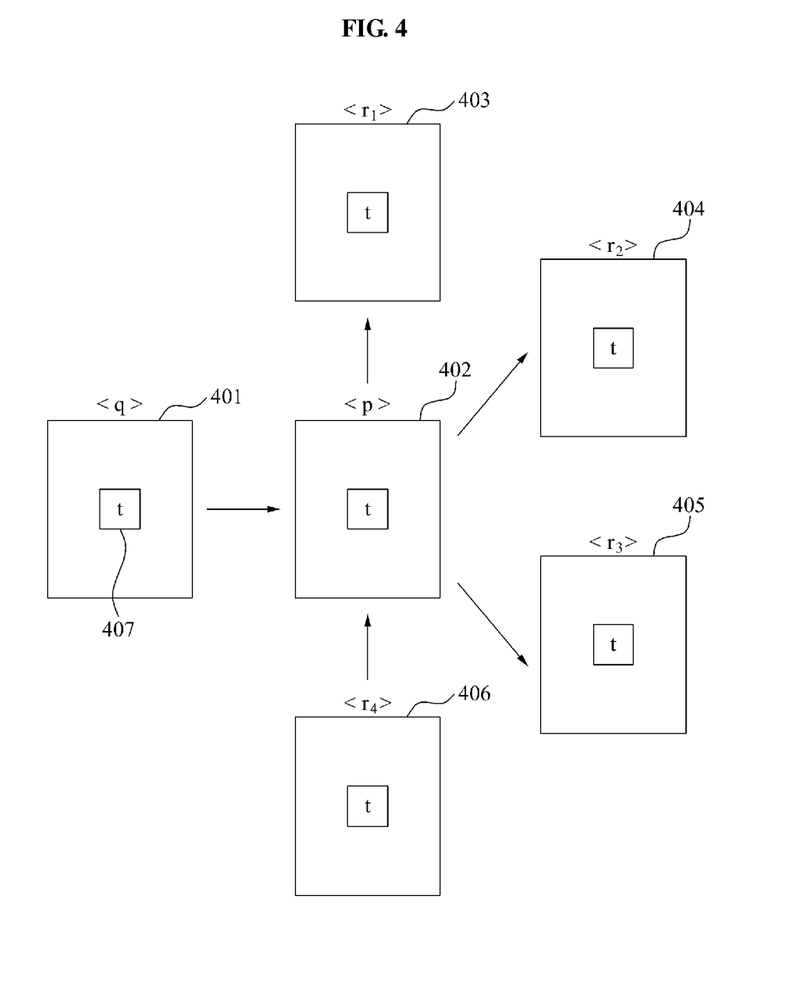
FIG. 4 is a diagram illustrating a process of calculating an accumulation coefficient of a document for a common word according to an exemplary embodiment of the present invention.

FIG. 4 is a diagram illustrating a process of calculating the accumulation coefficient of a document for a common word according to an embodiment of the present invention.

The accumulation coefficient calculating unit 203 may calculate the accumulation coefficient of the first document, corresponding to the ratio of the score for direct contribution by the first document to the contribution score of the first document for the common word. The accumulation coefficient may be applied to the invariant sum model and the hybrid model among schemes for ranking a document.

For example, the ranking unit 204 may rank a document through the invariant sum model in which an accumulation coefficient is applied to a content score and a contribution score or through the hybrid model in which an accumulation coefficient is applied to a contribution score.

For example, the accumulation coefficient calculating unit 203 may calculate an accumulation coefficient based on the following Equation 5.

$$\beta_t(p) = \frac{s_t(p)}{s_t(p) + \sum_{r \in outlink(p)} s_t(r)} \quad \text{[Equation 5]}$$

Here, $\beta_t(p)$ denotes an accumulation coefficient of a first document (a document p) for a word t. The accumulation coefficient calculating unit 203 may calculate the accumulation coefficient of the first document using the content score $s_t(p)$ of the first document and the content score $$\sum_{r \in outlink(p)} s_t(r)$$

of the fourth document (a document r) corresponding to an outlink of the first document. The accumulation coefficient may denote the ratio of the score for direct contribution by the first document to the contribution score of the first document with respect to the second document.

For example, referring to FIG. 4, it is assumed that a document <p> 402 and a document (o) (not shown in FIG. 4) correspond to documents contributing to a document <q> 401. A contribution score with respect to the document <q> 401 may refer to the sum of the contribution score of the document (o) with respect to the document <q> 401 and the contribution score of the document <p> 402 with respect to the document <q> 401. In this instance, the accumulation coefficient of the document <p> 402 may refer to the ratio of the contribution score of the document <p> 402 for directly contributing to the document (q) 401, to the contribution score with respect to the document <q> 401. Here, the contribution score and the accumulation coefficient are related to a word (t) 407.

$$\beta_t(p) + \sum_{r \in outlink(p)} \alpha_t^1(p, r) = 1 \quad \text{[Equation 6]}$$

In this instance, according to the invariant sum model, the sum obtained by applying the accumulation coefficient of the first document (the document (p) 402), and a contribution coefficient of the fourth document (a document (r1) 403 through a document (r4) 406) may be equal to a predetermined value, e.g., "1" when referring to Equation 6. Here, according to Equation 6, the sum of the accumulation coefficient of a document p and the contribution coefficient of a document r corresponding to an outlink of the document p is "1."

For a common word, the contribution score of a predetermined document (the document <p> 402 of FIG. 4) with respect to a super-document (the document <q> 401) may be equal to the sum of the contribution score by the predetermined document and the contribution score by sub-documents (the document <$r_1$> 403 through the document <$r_4$> 406 of FIG. 4) linked to the predetermined document by outlinks.

Since a contribution score with respect to a super-document is fixed, when the contribution score of sub-documents increases due to the increase of outlinks of a predetermined document, the contribution score by the predetermined document may decrease. Accordingly, the sum of document ranking scores of all documents on an overall web graph may be equal to the sum of content scores of all documents as illustrated in the following Equation 7.

$$\sum_p C_t(p) = \sum_p s_t(p). \quad \text{[Equation 7]}$$

Thus, according to Equation 7, since the document ranking score of a document (the document <p> 402 of FIG. 4) decreases as outlinks to the document <p> 402 of FIG. 4 increase, the abuse of outlinks may be prevented.

Finally, the document ranking score in the invariant sum model may be determined based on the following Equation 8.

$$C_t(p) = \beta_t(p)s_t(p) + \beta_t(p) \times \sum_d \sum_{q \in D(p,d)} \alpha_t^d(q, p)s_t(q) \quad \text{[Equation 8]}$$

That is, according to Equation 8, a document ranking score $C_t(p)$ of a document p for a word t may be determined as the sum of a content score $s_t(p)$ to which an accumulation coefficient $\beta_t(p)$ of the document p is applied and a contribution score $$\sum_d \sum_{q \in D(p,d)} \alpha_t^d(q, p)s_t(q),$$

of the document p for contribution to a document q, to which the accumulation coefficient $\beta_t(p)$ of the document p is applied.

A document ranking score in the hybrid model may be determined based on the following Equation 9.

$$C_t(p) = s_t(p) + \beta_t(p) \times \sum_d \sum_{q \in D(p,d)} \alpha_t^d(q, p)s_t(q) \quad \text{[Equation 9]}$$

According to Equation 9, a document ranking score $C_t(p)$ of a document p for a word t may be determined as the sum of the content score of the document p and the contribution score $$\sum_d \sum_{q \in D(p,d)} \alpha_t^d(q, p) s_t(q)$$

of the document p for contribution to a document q, to which an accumulation coefficient $\beta_t(p)$ of the document p is applied.

When Equation 7 and Equation 9 are applied to the hybrid model, Equation 10 may be obtained as below.

$$T_t = \sum_p C_t(p)$$ [Equation 10]

$$= \sum_p \{s_t(p) - \beta_t(p)s_t(p)\} + \sum_p s_t(p)$$

$$\leq 2 \sum_p s_t(p)$$

Here, $T_t$ denotes the sum of document ranking scores in the hybrid model. Equation 10 shows that the sum of all document ranking scores is less than or equal to two times the sum of the content scores of all documents in the hybrid model.

Referring to the descriptions with reference to FIG. 1 through FIG. 4, the document ranking scores of all documents for a predetermined word may be determined as Equation 11 given below. Equation 11 is based on the hybrid model, and descriptions below may be similarly applied to the basic model and the invariant sum model.

$$C_t(p) = V_t^0(p) + \beta_t(p) \times \sum_{d=1} V_t^d(p)$$ [Equation 11]

$$V_t^{k+1}(p) = \sum_{q \in inlink(p)} \alpha_t^1(q, p) V_t^k(q), k \geq 0,$$

$$V_t^0(q) = s_t(q).$$

In Equation 11, $C_t(p)$ denotes the document ranking score of the document p for the word t. $V_t^0(p)$ denotes the content score of the document p for the word t, $\beta_t(p)$ denotes an accumulation coefficient of the document p for the word t, and $V_t^d(p)$ denotes the contribution value, for the word t, of the document p that is linked to the document q through d-number of steps, for contribution to the document q, which corresponds to the product of a contribution coefficient and a content score.

The document ranking score of the document p for the word t may be calculated through the following preprocessing operations and repeated calculating operations.

S1. Calculating $s_t(p)$
S2. Calculating $\alpha_t^1(q,p)$ and $\beta_t(p)$
S3. $V_t^0(p) \leftarrow s_t(r)$ and $C_t^0(p) \leftarrow V_t^0(p)$
S4.

$$V_t^{k+1}(p) \leftarrow \sum_{q \in inlink} \alpha_t^1(q, p) V_t^k(q).$$

S5. $C_t^{k+1}(p) \leftarrow C_t^k(p) + \beta_t(p) \times V_t^{k+1}(p)$
S6. Repeating S4 and S5 for p satisfying $V_t^{k+1}(p) > \epsilon$. Terminating when $V_t^{k+1} \leq \epsilon$ for all p and t.

Here, S1 and S2 refer to the preprocessing operations, and S3, S4, S5, and S6 refer to the repeated calculating operations.

According to S1 of the preprocessing operations, a document ranking system may calculate the content score for a word t that is included in all documents (the document p). According to S2 of the preprocessing operations, the document ranking system may calculate a contribution coefficient for a common word, and calculate an accumulation coefficient for the common word.

According to S3 of the repeated calculating operations, the document ranking system may add the content score to a document ranking score (C-Rank). According to S4 of the repeated calculating operations, the document ranking system may calculate the contribution value of a document outlinked from each document. According to S5 of the repeated calculating operations, the document ranking system may add the result obtained by multiplying the calculated contribution value by the accumulation coefficient to the document ranking score (C-Rank). According to S6 of the repeated calculating operations, the document ranking system may repeat S4 and S5 for a document and word pair in which the contribution value is greater than or equal to a predetermined value $\epsilon$. Then, terminate the calculation when the contribution value is less than or equal to $\epsilon$ for all document and word pairs.

In this instance, when the contribution value of a portion of documents becomes less than or equal to a threshold value during repeated operations, the contribution value may be accumulated on an unsummed contribution value to be stored. As the repeated operations progress, the unsummed contribution value may become greater than or equal to the threshold value by a distant document or a document on another path. In response to the unsummed contribution value becoming greater than or equal to the threshold value, the document ranking system may multiply the unsummed contribution value by an accumulation coefficient to be accumulated on the document ranking score (C-Rank), which may be used for calculating the contribution value of an outlinked document.

The document ranking system may dynamically update a document ranking score (C-Rank) through a characteristic in which the contribution coefficient of a predetermined document may be calculated when the contribution coefficients with respect to super-documents in a link structure are obtained by a relation for the contribution coefficients of documents linked through multiple steps of links.

Thereafter, when the content of a document changes, the document ranking system may reflect the change and rank of the document. In response to a change of content of a document, the content score of the document may change, and a contribution coefficient associated with an inlink of the document and a contribution coefficient associated with an outlink of the document may change. Thus, the document ranking scores of documents indicating a document whose content is changed through a link and documents linked from the document whose content is changed may change.

Likewise, when a link is added or deleted, the contribution coefficient of a document may change. In response to the addition of a link, a contribution coefficient may be generated due to the added link, and in response to the deletion of a link, a contribution coefficient may not be generated due to the deleted link.

Also, when a document is added or deleted, a document ranking score may be determined based on the addition or deletion of a link.

Figure 5:
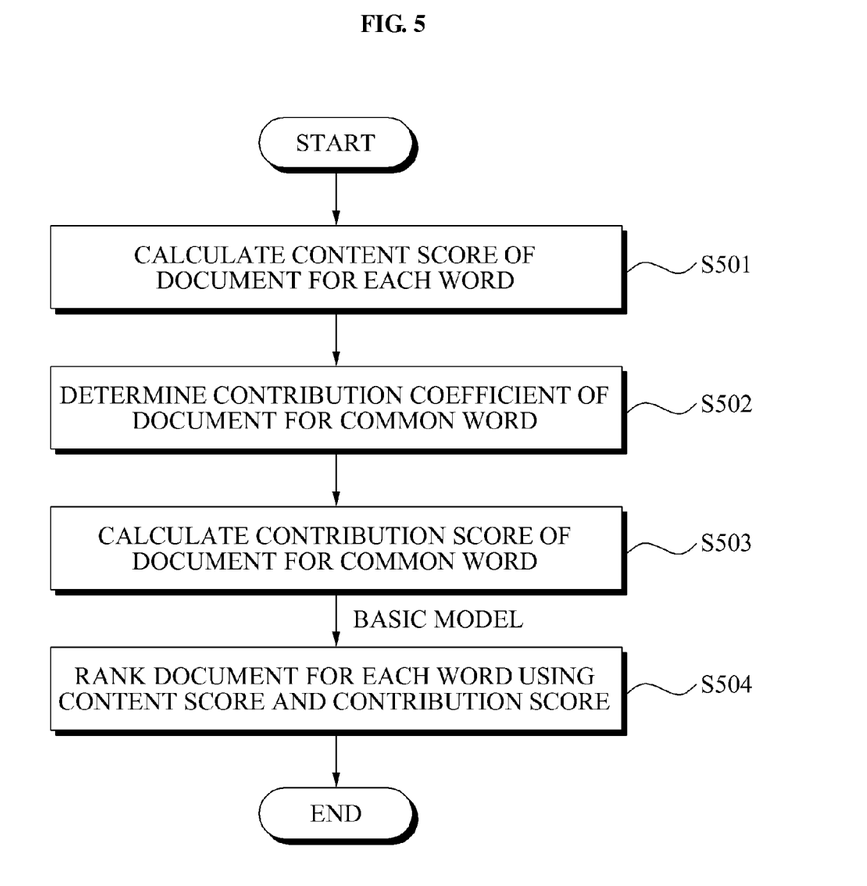
FIG. 5 is a flowchart illustrating an overall process of a document ranking method based on a basic model according to an exemplary embodiment of the present invention.

FIG. 5 is a flowchart illustrating an overall process of a document ranking method based on a basic model according to an embodiment of the present invention.

As described in the foregoing, the basic model refers to a model in which the ranking of a document increases as the number of inlinks increases, whereas the ranking of a document is independent from the increase or decrease of the number of outlinks.

A document ranking method of FIG. 5 may be performed through each component of the document ranking system 500 illustrated in FIG. 2.

In operation S501, the content score calculating unit 201 may calculate the content score of a document for each of at least one word contained in the document. As an example, the content score calculating unit 201 may calculate the content score based on relevance between the content of the document and the at least one word. As another example, the content score calculating unit 201 may calculate the content score by evaluating the quality of the document through the content of the document such as similarity of the document in terms of a word, sizes of letters, the length of the document, whether an image exists, and the like.

In operation S502, the contribution coefficient determining unit 205 may determine the contribution coefficient of the first document for contribution to the second document for the common word. Here, the contribution coefficient denotes a coefficient for contributing to the value of the second document by the first document, and the first document and the second document are connected through a link. The common word denotes at least one word included in the first document and the second document among at least one word included in the first document and the second document, respectively. The first document may contribute to the value of the second document through the common word.

Here, the first document denotes a linked document, and the second document denotes a document including a link. In this instance, when a link is connected from the second document to the first document, the first document denotes a document corresponding to an outlink of the second document, and the second document denotes a document corresponding to an inlink of the first document.

For example, when a link path is present to include a plurality of steps of links from the second document to the first document, the contribution coefficient determining unit 205 may determine the contribution coefficient of the first document for contributing to the second document using the contribution coefficient of a document corresponding to the link path. In this instance, when the first document is connected to the second link through a single link, the contribution coefficient determining unit 205 may determine the contribution coefficient of the first document for contributing to the second document using the content score of the first document, the content score of the second document, and the content score of the third document corresponding to an outlink of the second document. The contribution coefficient determining unit 205 may determine the contribution coefficient of the first document for contribution to the second document that is proportional to the content score of the first document and is inversely proportional to the content score of the second document and the content score of the third document.

The contribution coefficient for a common word may be determined for all documents including the common word.

In operation S503, a contribution score calculating unit 202 may calculate the contribution score of a document for a common word. For example, the contribution score calculating unit 202 may calculate the contribution score of the first document by applying the content score of the second document to the contribution coefficient of the first document for contributing to the second document.

In operation S504, a ranking unit 204 may rank the document for at least one word, using the content score and the contribution score. For example, according to a basic model, the ranking unit 204 may determine a document ranking score (C-Rank) by adding the content score and the contribution score, and then rank the document for a word based on the document ranking score.

Figure 6:
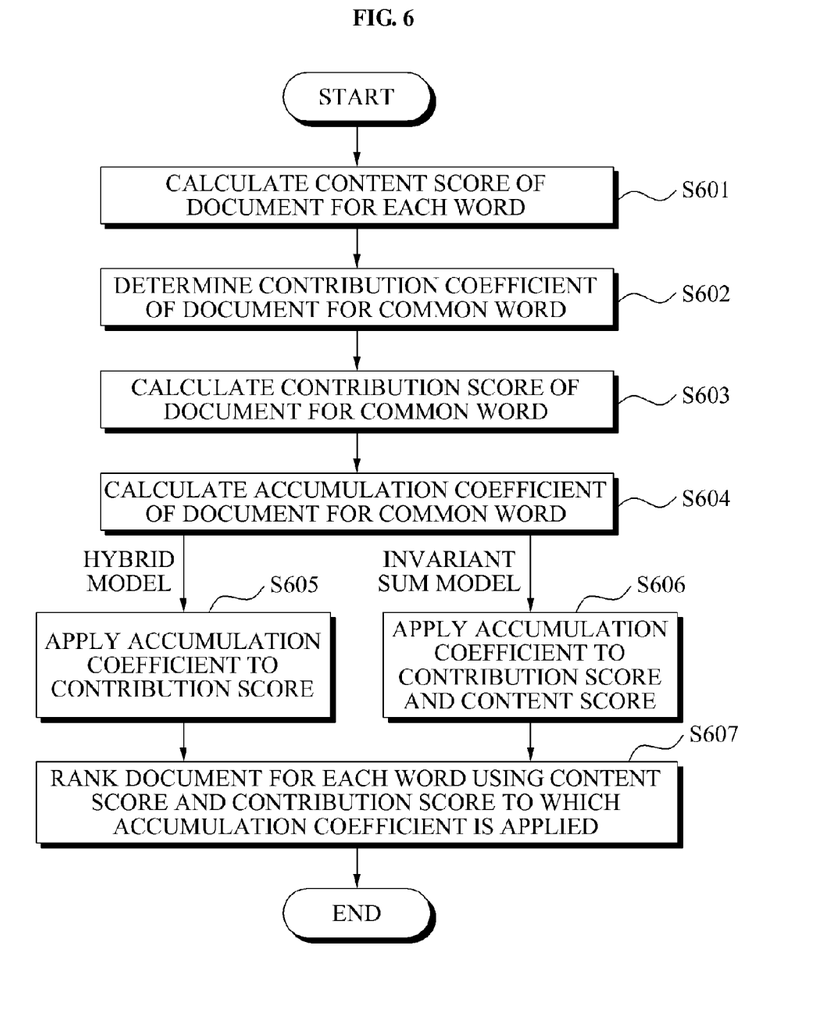
FIG. 6 is a flowchart illustrating an overall process of a document ranking method based on an invariant sum model and a hybrid model according to an exemplary embodiment of the present invention.

FIG. 6 is a flowchart illustrating an overall process of a document ranking method based on the invariant sum model and the hybrid model according to an embodiment of the present invention.

To prevent abuse that may be conducted with a system using the basic model, such as increasing a document ranking by adding an outlink through an abuse document, the invariant sum model may reflect an accumulation coefficient on a content score and a contribution score. Here, the accumulation coefficient corresponds to a score for direct contribution by a predetermined document out of the contribution scores for contribution to another document.

According to the hybrid model, the accumulation coefficient may be reflected on the contribution score to resolve an issue that web surfing may become difficult for a user due to restrictions on using outlinks while abuse of outlinks may be prevented.

Operation S501 through operation S503 described with reference to FIG. 5 may be similarly applied to operation S601 through operation S603, and thus further description will be omitted for conciseness.

In operation S604, the accumulation coefficient calculating unit 203 may calculate the accumulation coefficient of the first document, corresponding to the ratio of the score for directly contribution by the first document to the contribution score of the first document with respect to the common word. For example, the accumulation coefficient calculating unit 203 may calculate the accumulation coefficient of the first document, using the content score of the first document and the content score of the fourth document corresponding to an outlink of the first document. In this instance, the sum obtained by applying the accumulation coefficient of the first document and the contribution coefficient of the fourth document may be equal to a predetermined value, which corresponds to the invariant sum model.

Operation S605 corresponds to the document ranking method based on the hybrid model, and operation S606 corresponds to the document ranking method based on the invariant sum model.

In operation S605, the ranking unit 204 may apply the accumulation coefficient of the document to the contribution score of the document for a predetermined word. In operation S607, the ranking unit 204 may determine a document ranking score by adding the content score of the document to the contribution score of the document to which the accumulation coefficient is applied. The ranking unit 204 may rank the document using the document ranking score.

In operation S606, the ranking unit 204 may apply the accumulation coefficient to the contribution score and the content score, respectively, for each of at least one word. Thereafter, in operation S607, the ranking unit 204 may determine a document ranking score by adding the content score to which the accumulation coefficient is applied, to the contribution score to which the accumulation coefficient is applied. The ranking unit 204 may rank a document using the document ranking score.

Descriptions with reference to FIG. 1 through FIG. 4 may be referred to for a further examples omitted from descriptions with reference to FIG. 5 and FIG. 6.

The exemplary embodiments according to the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the well-known variety and available to those having skill in the computer software arts. Examples of computer-readable media include magnetic media such as hard disks, floppy disks, and magnetic tape; optical media such as CD ROM discs and DVD; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents. It is to be understood that both the foregoing general description and the following detailed description are exemplary and explanatory and are intended to provide further explanation of the invention as claimed.

The invention claimed is:

1. A document ranking system comprising:
a content score calculating unit comprising a processor configured to calculate a content score of a first document with respect to each of at least one word contained in the first document;
a contribution coefficient determining unit to determine a contribution coefficient of the first document indicative of the first document's contribution value to a second document with respect to a common word included in the first document and the second document;
a contribution score calculating unit to calculate a contribution score of the first document based on the contribution coefficient of the first document;
a storage device to store the content score and the contribution score;
a ranking unit to rank the first document for the at least one word, based on the content score and the contribution score; and
an accumulation coefficient calculating unit to calculate an accumulation coefficient of the first document, the accumulation coefficient corresponding to a contribution by the first document to the contribution score of the first document to the second document with respect to the common word,
wherein the ranking unit is configured to apply the accumulation coefficient to the content score and the contribution score, or to apply the accumulation coefficient to the contribution score.

2. The document ranking system of claim 1, wherein the content score calculating unit is configured to calculate the content score based on relevance between content of the first document and the at least one word.

3. The document ranking system of claim 1, wherein the contribution score calculating unit is configured to apply a content score of the second document to the contribution coefficient of the first document for contribution to the second document, to calculate the contribution score of the first document.

4. The document ranking system of claim 1, wherein, in response to a presence of a link path having a plurality of steps of links from the second document to the first document, the contribution coefficient determining unit is configured to determine the contribution coefficient of the first document for contribution to the second document based on a contribution coefficient of a plurality of documents corresponding to the link path.

5. The document ranking system of claim 4, wherein, in response to the first document being connected to the second document through a single link, the contribution coefficient determining unit is configured to determine the contribution coefficient of the first document for contribution to the second document based on the content score of the first document, a content score of the second document, and a content score of a third document connected by an outlink of the second document.

6. The document ranking system of claim 5, wherein the contribution coefficient determining unit is configured to determine the contribution coefficient of the first document for contribution to the second document that is proportional to the content score of the first document and is inversely proportional to the content score of the second document and the content score of the third document.

7. The document ranking system of claim 4, wherein, in response to determining that content of a document corresponding to at least one link on the link path having a plurality of steps of links from the second document to the first document has changed, the contribution coefficient determining unit is configured to re-determine a contribution coefficient associated with an inlink of the changed document and a contribution coefficient associated with an outlink of the changed document.

8. The document ranking system of claim 7, wherein the contribution score calculating unit is configured to re-determine a contribution score of a document connected through an inlink and a document connected through an outlink based on the contribution coefficient of a document comprising changed content.

9. The document ranking system of claim 1, wherein the accumulation coefficient calculating unit is configured to calculate the accumulation coefficient of the first document, based on the content score of the first document and a content score of a fourth document connected by an outlink of the first document.

10. The document ranking system of claim 9, wherein a sum resulting from applying the accumulation coefficient of the first document and a contribution coefficient of the fourth document equals a predetermined value.

11. The document ranking system of claim 1, further comprising:
a community generating unit to generate a community based on content scores and contribution scores of a plurality of documents having words associated with a subject.

12. The document ranking system of claim 11, wherein the community generating unit is configured:
to calculate a sum of document ranking scores of documents with respect to the words associated with the subject, the document ranking score of each document being determined based on a content score and a contribution score of each of the documents; and to retrieve neighboring documents of a document having a greatest document ranking score to construct a sub-graph.

13. The document ranking system of claim 12, wherein the community generating unit is further configured to retrieve documents which are not included in the sub-graph, starting from a document having a document ranking score greater than or equal to a certain score to neighboring documents of the another document, to construct another sub-graph.

14. The document ranking system of claim 13, wherein a sub-graph having a number of documents greater than or equal to a certain number is determined to be the community.

15. The document ranking system of claim 14, wherein, in response to determining a link is deleted from or added to a link path comprising a plurality of steps of links from the second document to the first document, the contribution coefficient determining unit is configured to re-determine contribution coefficients of documents corresponding to links included in the link path.

16. A document ranking method that uses a computer processor for calculation, comprising:
    calculating, using the computer processor, a content score of a first document with respect to each of at least one word contained in the first document;
    determining, using the computer processor, a contribution coefficient of the first document indicative of the first document's contribution value to a second document with respect to a common word included in the first document and the second document;
    calculating, using the computer processor, a contribution score of the first document based on the contribution coefficient of the first document;
    ranking, using the computer processor, the first document for the at least one word using the content score and the contribution score; and
    calculating, using the computer processor, an accumulation coefficient of the first document corresponding to a contribution by the first document to the contribution score of the first document to the second document, with respect to the common word,
    wherein the ranking comprises applying the accumulation coefficient to the content score and the contribution score, or applying the accumulation coefficient to the contribution score.

17. The document ranking method of claim 16, wherein the content score is calculated based on relevance between content of the first document and the at least one word.

18. The document ranking method of claim 16, wherein the contribution score of the first document is calculated by applying a content score of the second document to the contribution coefficient of the first document.

19. The document ranking method of claim 16, wherein, in response to a presence of a link path having a plurality of steps of links from the second document to the first document, the contribution coefficient of the first document is calculated using a contribution coefficient of a plurality of documents existing on the link path.

20. The document ranking method of claim 19, wherein, when the first document is connected to the second document through a single link, the determining comprises determining the contribution coefficient of the first document for contribution to the second document using the content score of the first document, a content score of the second document, and a content score of the third document connected by an outlink of the second document.

21. The document ranking method of claim 20, wherein the contribution coefficient of the first document is proportional to the content score of the first document and is inversely proportional to the content score of the second document and the content score of the third document.

22. The document ranking method of claim 19, further comprising, in response to determining that content of a document corresponding to at least one link on the link path having a plurality of steps of links from the second document to the first document has changed, re-determining a contribution coefficient associated with an inlink of the changed document and a contribution coefficient associated with an outlink of the changed document.

23. The document ranking method of claim 22, wherein the calculating of the contribution score comprises re-determining a contribution score of a document connected through an inlink and a document connected through an outlink based on the contribution coefficient of a document containing changed content.

24. The document ranking method of claim 19, wherein, in response to determining that a link is deleted from or added to a link path comprising a plurality of steps of links from the second document to the first document, the determining comprises re-determining contribution coefficients of documents corresponding to links included in the link path.

25. The document ranking method of claim 16, wherein the accumulation coefficient of the first is calculated using the content score of the first document and a content score of a fourth document connected by an outlink of the first document.

26. The document ranking method of claim 25, wherein a sum obtained by applying the accumulation coefficient of the first document and a contribution coefficient of the fourth document equals a predetermined value.

27. A non-transitory computer-readable medium storing a program for instructing a computer to perform the method of claim 16.

28. The document ranking method of claim 16, further comprising:
    generating a community using content scores and contribution scores of a plurality of documents having words associated with a subject.

29. The document ranking method of claim 28, wherein the community generating further comprises:
    calculating a sum of document ranking scores of documents with respect to the words associated with the subject, the document ranking score of each document being determined using a content score and a contribution score of each of the documents, and
    constructing a sub-graph by retrieving neighboring documents of a document having a greatest document ranking score.

30. The document ranking method of claim 29, further comprises constructing another sub-graph by an operation of retrieving documents which are not included in the sub-graph, starting from another document having a document ranking score greater than or equal to a certain score to neighbor documents of the another document.

31. The document ranking method of claim 30, wherein a sub-graph having a number of documents greater than or equal to a certain number is determined to be the community.

* * * * *